United States Patent
Li et al.

(10) Patent No.: US 9,766,470 B2
(45) Date of Patent: Sep. 19, 2017

(54) THREE-DIMENSIONAL (3D) DISPLAY DEVICE

(71) Applicants: BOE Technology Group Co., Ltd., Beijing (CN); Beijing BOE Optoelectronics Technology Co., Ltd., Beijing (CN)

(72) Inventors: Wei Li, Beijing (CN); Xue Dong, Beijing (CN); Kaixuan Wang, Beijing (CN); Hongliang Yuan, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 267 days.

(21) Appl. No.: 14/572,003

(22) Filed: Dec. 16, 2014

(65) Prior Publication Data
US 2016/0011428 A1 Jan. 14, 2016

(30) Foreign Application Priority Data
Jul. 10, 2014 (CN) .......................... 2014 1 0327883

(51) Int. Cl.
*G02F 1/155* (2006.01)
*G02F 1/153* (2006.01)
(Continued)

(52) U.S. Cl.
CPC ..... *G02B 27/2214* (2013.01); *H04N 13/0413* (2013.01); *G02F 1/13* (2013.01);
(Continued)

(58) Field of Classification Search
CPC ......... G09G 3/3648; G09G 2300/0426; G09G 3/3677; G09G 3/36; G09G 2300/0809;
(Continued)

(56) References Cited

U.S. PATENT DOCUMENTS 5,189,549 A * 2/1993 Leventis .................. F21K 2/08
359/268
2010/0271685 A1 10/2010 Liu
(Continued)

FOREIGN PATENT DOCUMENTS

CN 102034661 A 4/2011
CN 102478739 A 5/2012
(Continued)

OTHER PUBLICATIONS

Apr. 28, 2016—(CN)—Second Office Action Appn 201410327883.7 with English Tran.
(Continued)

*Primary Examiner* — Evelyn A Lester
(74) *Attorney, Agent, or Firm* — Banner & Witcoff, Ltd.

(57) ABSTRACT

An embodiment of the present invention provides a three-dimensional (3D) display device. The 3D display device comprises: a display panel, configured to display an image and comprising a plurality of pixels; and a 3D grating, disposed at a light-emitting side of the display panel and comprising an electrochromic layer, wherein the electrochromic layer comprises a plurality of electrochromic strip bodies spaced apart from each other with an equal interval, and when a voltage is applied to each of the plurality of electrochromic strip bodies, a change between a light-shielding state and a light-transmitting state is achieved.

14 Claims, 5 Drawing Sheets

(51) Int. Cl.
*G02B 27/22* (2006.01)
*H04N 13/04* (2006.01)
*G09G 3/36* (2006.01)
*G02F 1/163* (2006.01)
*G02F 1/15* (2006.01)
*G02F 1/1335* (2006.01)
*G02F 1/13* (2006.01)

(52) U.S. Cl.
CPC ...... *G02F 1/1335* (2013.01); *G02F 1/133528* (2013.01); *G02F 1/15* (2013.01); *G02F 1/155* (2013.01); *G02F 1/1533* (2013.01); *G02F 1/163* (2013.01); *G02F 2001/1536* (2013.01); *G09G 3/36* (2013.01); *G09G 3/3648* (2013.01); *G09G 3/3677* (2013.01); *G09G 2300/0426* (2013.01); *G09G 2300/0809* (2013.01); *H04N 2213/001* (2013.01)

(58) Field of Classification Search
CPC ........ G02F 1/155; G02F 1/1533; G02F 1/163; G02F 2001/1536; G02F 1/13; G02F 1/133528; G02F 1/15; G02F 1/1335
USPC ....... 359/265–274; 349/215; 345/32, 41, 43, 345/84, 87, 98, 105
See application file for complete search history.

(56) References Cited

U.S. PATENT DOCUMENTS

2012/0229721 A1* 9/2012 Kimura ............. G02F 1/136213
349/39
2013/0021561 A1* 1/2013 Ahn .................. G02F 1/133512
349/77

FOREIGN PATENT DOCUMENTS

| CN | 102487055 A | 6/2012 |
| CN | 102572667 A | 7/2012 |
| CN | 202895860 U | 4/2013 |
| CN | 202948233 U | 5/2013 |
| CN | 103207456 A | 7/2013 |
| JP | 2009053391 A | 3/2009 |
| JP | 2013167843 A | 8/2013 |

OTHER PUBLICATIONS

Jun. 23, 2016—(CN)—Third Office Action Appn 201410327883.7 with English Tran.
Dec. 2, 2015—(CN)—First Office Action Appn 201410327883.7 with English Tran.
Nov. 14, 2016—(CN) Fourth Office Action Appn 201410327883.7 with English Tran.

* cited by examiner

THREE-DIMENSIONAL (3D) DISPLAY DEVICE

This application claims priority to Chinese Patent Application No. 201410327883.7, filed on Jul. 10, 2014. The present application claims priority to and the benefit of the above-identified application and is incorporated herein in its entirety.

TECHNICAL FIELD

Embodiments of the present invention relate to a three-dimensional (3D) display device.

BACKGROUND

At present, the 3D (three-dimensional) display technology has attracted a lot of attentions, and its most fundamental principle is: different pictures are received by left and right eyes of a person, respectively, and then are subjected to superimposing, renascence of image information, etc., in a brain, thereby forming a stereoscopic image.

The 3D display technology is mainly classified into a naked-eye 3D display technology and a glasses 3D display technology, wherein the glasses 3D display technology requires the wearing of special glasses which is inconvenient to carry, so that the naked-eye 3D display technology has an advantage. The current naked-eye 3D display technology mainly comprises a parallax barrier type and a lenticular lens type, wherein the parallax barrier type naked-eye 3D display is a main naked-eye 3D display technology.

Figure 1:
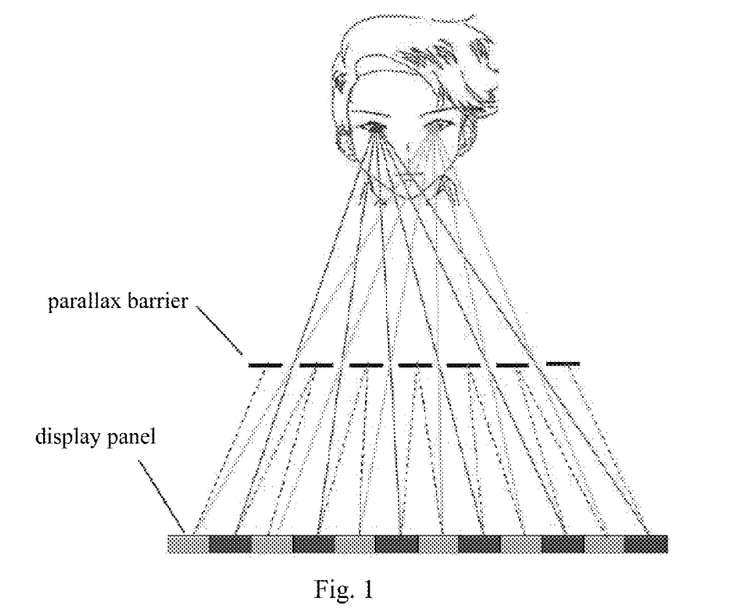
FIG. 1 is a schematic principle view of the current naked-eye 3D display.

In general, a parallax barrier type naked-eye 3D display device is to arrange a shielding member such as a barrier or a slit grating on the front of a display panel. As illustrated in FIG. 1, in a 3D display mode, a left-eye image information and a right-eye image information are selectively separated by the barrier or the slit grating, namely a left eye of a viewer can only see pixels for displaying the left-eye image information and a right eye of the viewer is shielded and cannot see the pixels for displaying the left-eye image information, and vice versa. Therefore, the left eye of the viewer can only see a left-eye image displayed by a display screen and the right eye of the viewer can only see a right-eye image displayed by the display screen, thus, the viewer can receive a pair of stereoscopic images with the parallax and the 3D effect can be achieved.

Illustratively, one layer of liquid crystal grating is commonly overlapped on a surface at a light-emitting side of a display panel. The liquid crystal grating is in normally white state when not energized and is formed as alternately dark and bright stripes when energized, and hence the 3D display can be achieved. Currently, the 3D display technology is relatively mature and less expensive and can achieve the 2D/3D switching. However, as one layer of liquid crystal grating is required to be overlapped on the display panel, the overall thickness of a 3D display module is relatively large. Moreover, the light transmittance loss in the case of 2D display is relatively high and the loss is about 20%.

SUMMARY

The embodiment of the present invention provides a 3D display device, which can reduce the light transmittance loss of a naked-eye 3D display device and has a reduced thickness of a module.

An embodiment of the present invention provides a 3D display device, which comprises: a display panel, configured to display an image and comprising a plurality of pixels; and a 3D grating, disposed at a light-emitting side of the display panel and comprising an electrochromic layer, wherein the electrochromic layer comprises a plurality of electrochromic strip bodies spaced apart from each other with an equal interval, and when a voltage is applied to each of the plurality of electrochromic strip bodies, a change between a light-shielding state and a light-transmitting state is achieved.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Detailed description will be given below to a 3D display device provided by an embodiment of the present invention with reference to the accompanying drawings.

The thickness of films and the dimension and shape of regions in the accompanying drawings do not reflect the true scale of the 3D display device and are only intended to illustrate the content of the embodiments of the present invention.

Figure 2:
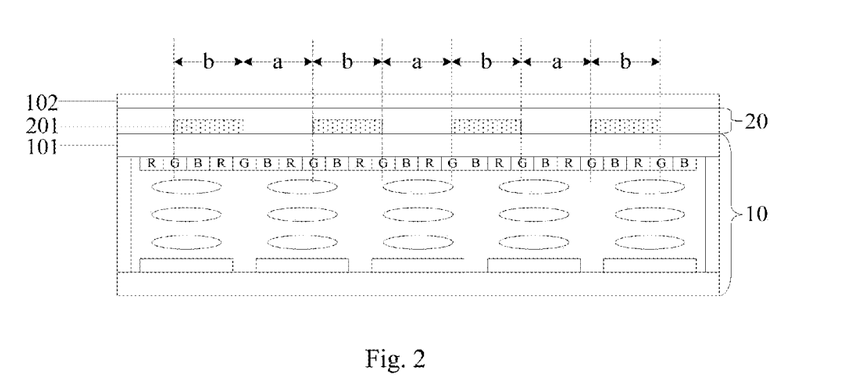
FIG. 2 is a schematic structural view of a 3D display device provided by an embodiment of the present invention.

An embodiment of the present invention provides a 3D display device. As illustrated in FIG. 2, the 3D display device comprises: a display panel 10, configured to display an image and comprising a plurality of pixels; and a 3D grating 20, disposed at a light-emitting side of the display panel 10 and comprising an electrochromic layer 201, wherein the electrochromic layer 201 comprises a plurality of electrochromic strip bodies 201 spaced apart from each other with an equal interval; when a voltage is applied to each of the plurality of electrochromic strip bodies 201, the change between a light-shielding state and a light-transmitting state can be achieved, and the interval between any two adjacent electrochromic strip bodies 201 is a.

Illustratively, the electrochromic strip bodies 201 and the interval a are alternately arranged; the electrochromic strip bodies of the electrochromic layer 201 are in the light-shielding state when applied with voltage and are in the light-transmitting state when not applied with the voltage; or, the electrochromic strip bodies 201 of the electrochromic layer are in the light-shielding state when not applied with voltage and are in the light-transmitting state when applied with voltage. Description will be given below by taking a case that the electrochromic layer 201 is in the light-shielding state when applied with voltage and is in the light-transmitting state when not applied with the voltage as an example. In this case, in a 3D display mode, regions corresponding to the electrochromic strip bodies 201 become light-shielding regions b when applied with voltage, and the interval a between the electrochromic strip bodies 201 becomes a light-transmitting region.

Illustratively, the electrochromic layer 201 is directly disposed on a base substrate 101 of the display panel 10.

In the 3D display device provided by an embodiment of the present invention, an original underlayer base of the 3D grating 20 is omitted and the 3D grating 20 is directly disposed on the base substrate 101 at a light-emitting side of the display panel 10, so that the overall thickness of a module can be reduced. Moreover, as the underlayer base of the 3D grating 20 is omitted, the light transmittance loss of the 3D display device can also be reduced.

Illustratively, in the display panel 10 of the 3D display device provided by an embodiment of the present invention, a plurality of pixels are generally arranged in an array. In the 3D display mode, for example, a left-eye image may be displayed in odd columns of pixels and a right-eye image may be displayed in even columns of pixels. Of course, a plurality of columns of pixels may also be taken as a cycle and the left-eye image and the right-eye image are alternately displayed. No specific limitation will be given here. It should be noted that the more the pixel columns in one cycle, the lower the accuracy of the 3D display. Thus, the left-eye image is generally displayed in the odd columns of pixels and the right-eye image is generally displayed in the even columns of pixels. Therefore, in the 3D display mode, in order to make the 3D grating 20 to respectively shield two eyes of a viewer, so that a left eye of the viewer can only see the left-eye image displayed in a display screen and a right eye of the viewer can only see the right-eye image displayed in the display screen, and the 3D effect is achieved, one electrochromic strip body 201 of the 3D grating 20, namely, the formed light-shielding region b after applied with voltage, generally corresponds to two adjacent columns of pixels in the display panel 10, in which one column of pixels is configured to display the left-eye image and the other column of pixels is configured to display the right-eye image. Therefore, the left-eye image and the right-eye image respectively enter corresponding the left eye and the right eye from the interval a adjacent to the light-shielding region b, namely the light-transmitting region a, and hence the 3D display effect can be achieved.

In the 3D display device provided by an embodiment of the present invention, the voltage is applied to each of the plurality of electrochromic strip bodies 201 in the 3D grating 20, so that the electrochromic strip body 201 is converted into being in the light-shielding state, and hence a light-shielding stripe is formed. Illustratively, in order to achieve the function of applying voltage to each of the plurality of electrochromic strip bodies 201, as illustrated in FIGS. 3a to 3d, the 3D grating in the 3D display device provided by an embodiment of the present invention further comprises: a first transparent electrode 202 and a second transparent electrode 203 connected with each of the electrochromic strip bodies. In the 3D display mode, the color change of the electrochromic layer may be controlled by applying a positive voltage signal (or a negative voltage signal) to the first transparent electrode 202 and a negative voltage signal (or a positive voltage signal) to the second transparent electrode 203. In general, the color change of the electrochromic layer 201 may be controlled by controlling a voltage difference between the first transparent electrode 202 and the second transparent electrode 203 to be about 10V. For example, the first transparent electrode may be applied with a positive voltage or a negative voltage or may be grounded, and correspondingly, the second transparent electrode may also be grounded or applied with a negative voltage or a positive voltage, as long as the voltage difference between the first transparent electrode and the second transparent electrode is guaranteed to be about 10 V. No limitation will be given in the embodiments of the present invention.

Illustratively, in the 3D display device provided by an embodiment of the present invention, the first transparent electrode 202 and the second transparent electrode 203 for applying voltage to the electrochromic strip bodies may have a plurality of implementation structures. Description will be given below.

Figure 3A:
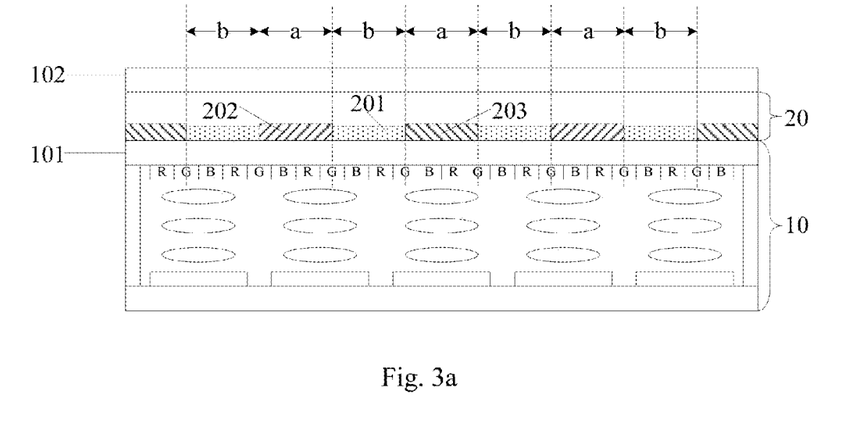
FIGS. 3a to 3d are schematic structural views of a first transparent electrode and a second transparent electrode of a 3D grating in the 3D display device provided by the embodiment of the present invention.
Figure 3B:
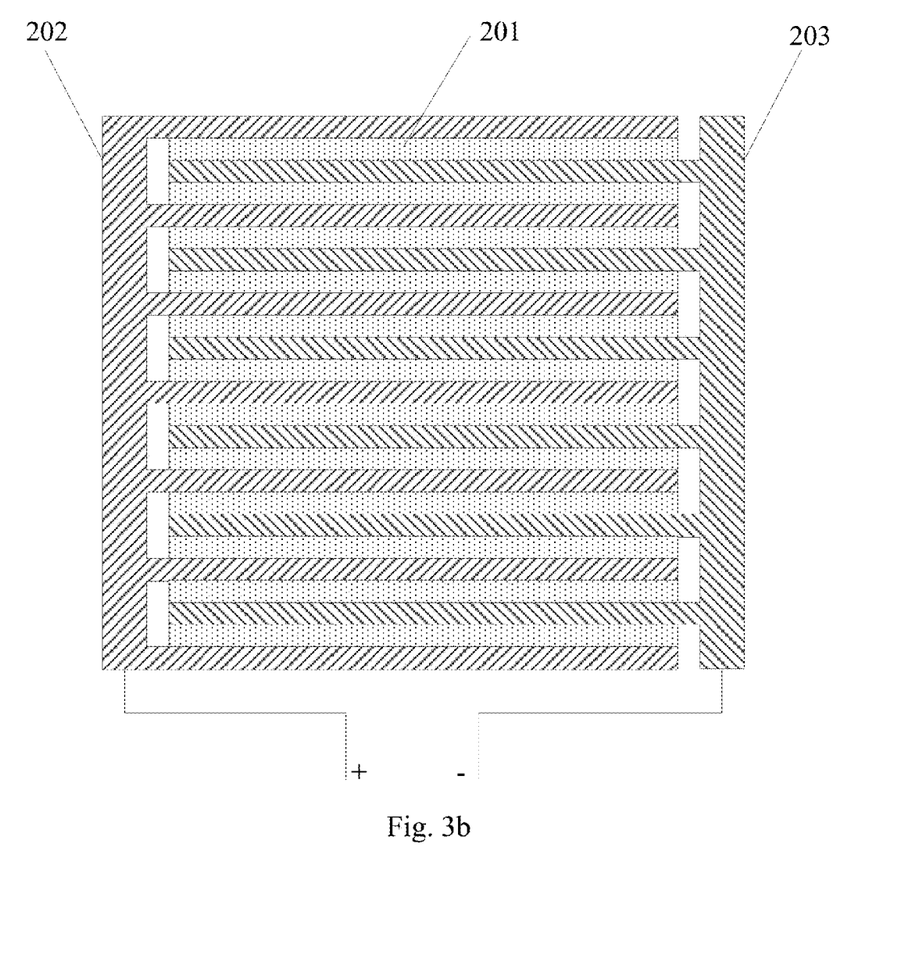

In a first implementation structure of the first transparent electrode 202 and the second transparent electrode 203, as illustrated in FIG. 3a, the first transparent electrode 202 and the second transparent electrode 203 may be alternately arranged in the intervals a between the electrochromic strip bodies 201 of the 3D grating. Illustratively, the first transparent electrodes 202, the second transparent electrodes 203 and the electrochromic strip bodies 201 are disposed at different regions of the same film layer. Moreover, as the plurality of first transparent electrodes 202 may applied with the same voltage signal in the 3D display mode and the plurality of second transparent electrodes 203 may also applied with the same voltage signal, as illustrated in FIG. 3b, each of the first transparent electrodes 202 may be connected at one end and each of the second transparent electrodes 203 may be connected at the other end, so that a comb-shaped structure as shown in FIG. 3b may be formed by both. In addition, the electrochromic layer 201 formed with electrochromic material and respectively connected with the first transparent electrode 202 and the second transparent electrode 203 are deposited at each of gaps between comb teeth. Furthermore, illustratively, at a contact position between the first transparent electrode 202 or the second transparent electrode 203 and the electrochromic strip body 201, the first transparent electrode 202 or the second transparent electrode 203 and the electrochromic strip body 201 may be set to be partly overlapped and contact to each other, so that the first transparent electrode 202 or the second transparent electrode 203 can better apply the voltage signal to the electrochromic layer 201.

Figure 3C:
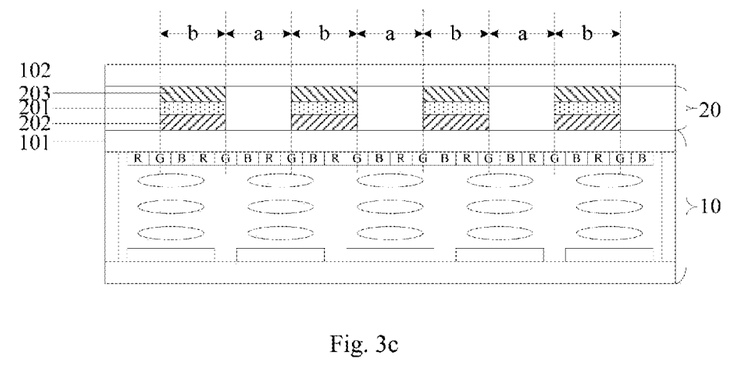
Figure 3D:
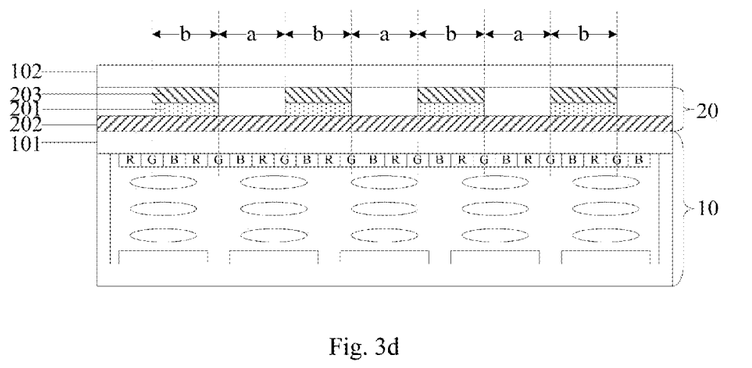

Illustratively, in a second implementation structure of the first transparent electrode 202 and the second transparent electrode 203, as illustrated in FIGS. 3c and 3d, the first transparent electrode 202 may be disposed between the electrochromic layer 201 and the base substrate 101, and the second transparent electrode 203 is disposed above the electrochromic layer 201, that is, the first transparent electrode 202, the electrochromic layer 201 and the second transparent electrode 203 are mutually overlapped. As illustrated in FIG. 3d, the second transparent electrode 202 comprises a plurality of second electrodes, and each of the second electrodes is disposed on each of the plurality of electrochromic strip bodies.

Illustratively, as illustrated in FIG. 3c, the first transparent electrode 202 may be only disposed between each of the plurality of electrochromic strip bodies 201 and the base substrate and not disposed at an region corresponding to the interval a, and hence the first transparent electrodes 202 needs to be formed by a patterning process; or as illustrated in FIG. 3d, the first transparent electrode 202 may be disposed at regions corresponding to the light transmitting region a and the light-shielding region b, and hence the patterning process may be not adopted to form the first transparent electrode 202. Moreover, the second transparent electrode 203 is only disposed above each of the plurality of electrochromic strip bodies, that is to say, the second transparent electrodes 203 are only disposed in the light-shielding regions b, thus, a patterning process is usually required in the manufacturing process.

As can be seen, a film structure of the first implementation structure of the first transparent electrode 202 and the second transparent electrode 203 is relatively simpler than that of the second implementation structure. In the first implementation structure, as the first transparent electrode 202 and the second transparent electrode 203 are disposed in the same film layer, the manufacturing process is more simpler compared with the second implementation structure. But compared with the second implementation structure, in the first implementation structure, a contact area between the first transparent electrode 202 and the second transparent electrode 203 and the electrochromic layer 201 is relatively small, and correspondingly, the signal transmission quality is also relatively poor. The specific implementation structure of the first transparent electrode 202 and the second transparent electrode 203 may be selected according to actual requirements in actual application. No limitation will be given here.

Moreover, in the 3D display device provided by an embodiment of the present invention, in order to achieve the light-shielding effect, the electrochromic layer 201 in the 3D grating 20 may be formed by at least one layer of electrochromic material, for example, may be formed by one layer of electrochromic material converted into black after applied with voltage, for example, inorganic material such as ferroferrocyanide (Prussian white) or other single material such as an electrochromism film may be utilized; and the electrochromic layer 201 may also be formed by a plurality of layers of electrochromic materials which converted into different colors after applied with voltage and the different colors can be combined into black finally, for example, formed by a plurality of kinds of materials such as electrochromic red phenothiazine, electrochromic blue viologen and electrochromic yellow polyaniline in proportion. No limitation will be given here.

Illustratively, the electrochromic layer 201 may be formed by three layers of electrochromic materials, for example, comprises electrochromic red phenothiazine, electrochromic blue viologen and electrochromic yellow polyaniline stacked in sequence.

It should be noted that: no matter that the electrochromic layer 201 is formed by a plurality of layers of electrochromic materials or formed by a single layer of electrochromic material, the overall thickness of a film layer deposited on the surface of the base substrate 101 and configured to form the 3D grating may not exceed dozens of micrometers, and compared with a liquid crystal grating type slit grating with a thickness of hundreds of micrometers, the overall thickness of the 3D grating is greatly reduced. Moreover, in the 3D display device provided by an embodiment of the present invention, a distance between the 3D grating 20 and the display panel 10 is only the thickness of the base substrate 101 at the light-emitting side of the display panel 10, and the thickness of the base substrate is generally controlled to be about 0.1 to 0.2 mm.

Illustratively, as illustrated in FIG. 2, the display panel 10 in the 3D display device provided by an embodiment of the present invention may be an LCD panel, and an upper polarizer 102 of the LCD panel may be bonded to a light-emitting side of the 3D grating 20.

Figure 4:
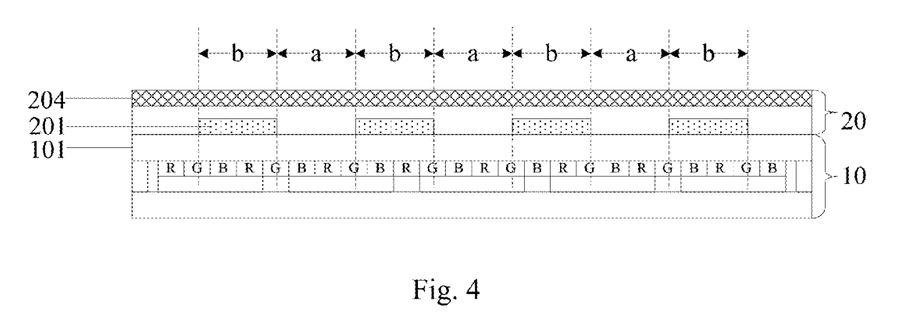
FIG. 4 is another schematic structural view of a 3D display device provided by an embodiment of the present invention.

Illustratively, as illustrated in FIG. 4, the display panel 10 in the 3D display device provided by an embodiment of the present invention may also be an OLED display panel. At this point, a quarter-wave plate 204 may be disposed at a light-emitting side of the 3D grating 20 and can prevent external ambient light from interfering with the 3D image display of the 3D display device after being incident into the 3D display device.

In the 3D display device provided by an embodiment of the present invention, the 3D grating is directly disposed on the base substrate at the light-emitting side of the display panel and comprises the electrochromic layer, the electrochromic layer comprises the plurality of electrochromic strip bodies spaced apart from each other with an equal interval; and when voltage is applied to each of the electrochromic strip bodies, the change between the light-shielding state and the light-transmitting state can be achieved, so that the 3D grating can be formed as the plurality of alternately arranged light transmission regions and light-shielding regions in the 3D display mode, and hence the 3D display function can be achieved. In the 3D display device provided by an embodiment of the present invention, as an original underlayer base of the 3D grating is omitted and the 3D grating is directly disposed on the base substrate at the light-emitting side of the display panel, the overall thickness of the module can be reduced. Moreover, as the underlayer base of the 3D grating is saved, the light transmittance loss of the display device can also be reduced.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to comprise the modifications and deformations.

The invention claimed is:

1. A three-dimensional (3D) display device, comprising:
a display panel, configured to display an image and comprising a plurality of pixels; and
a 3D grating, disposed at a light-emitting side of the display panel and comprising an electrochromic layer,
wherein the electrochromic layer comprises a plurality of electrochromic strip bodies spaced apart from each other with an equal interval,
the 3D grating further comprises a first transparent electrode and a second transparent electrode, connected with each of the electrochromic strip bodies, and a plurality of first strips of the first transparent electrode and a plurality of second strips of the second transparent electrode are alternately arranged in gaps between the plurality of electrochromic strip bodies, and
when a voltage is applied to each of the plurality of electrochromic strip bodies, a change between a light-shielding state and a light-transmitting state is achieved.

2. The 3D display device according to claim 1, wherein a state of the plurality of electrochromic strip bodies is converted from the light-shielding state to the light-transmitting state under a condition that the voltage is applied.

3. The 3D display device according to claim 1, wherein a state of the plurality of electrochromic strip bodies is converted from the light-transmitting state to the light-shielding state under a condition that the voltage is applied.

4. The 3D display device according to claim 1, wherein the plurality of electrochromic strip bodies have same width, each of the plurality of electrochromic strip bodies corresponds to two adjacent columns of pixels in the display panel and one column of pixels among the two adjacent columns of pixels is configured to display a left-eye image and the other column of pixels is configured to display a right-eye image.

5. The 3D display device according to claim 1, wherein the first transparent electrodes and the second transparent electrodes are arranged in the same layer with the plurality of electrochromic strip bodies.

6. The 3D display device according to claim 1, wherein the electrochromic layer is disposed on a base substrate of the display panel.

7. The 3D display device according to claim 1, wherein the electrochromic layer comprises at least one layer of electrochromic material.

8. The 3D display device according to claim 7, wherein the electrochromic layer comprises three layers of electrochromic materials.

9. The 3D display device according to claim 8, wherein the electrochromic layer comprises electrochromic red phenothiazine, electrochromic blue viologen and electrochromic yellow polyaniline in sequence.

10. The 3D display device according to claim 7, wherein the electrochromic layer comprises black electrochromic material.

11. The 3D display device according to claim 1, wherein the display panel is a liquid crystal display (LCD) panel and an upper polarizer of the LCD panel is bonded to a light-emitting side of the 3D grating.

12. The 3D display device according to claim 1, wherein the display panel is an organic light-emitting diode display panel and a quarter-wave plate is disposed at a light-emitting side of the 3D grating.

13. The 3D display device according to claim 1, wherein the first transparent electrode is comb-shaped and the second transparent electrode is comb-shaped.

14. The 3D display device according to claim 1, wherein the second transparent electrode is comb-shaped.

* * * * *